(12) United States Patent
Ko et al.

(10) Patent No.: US 10,022,830 B2
(45) Date of Patent: Jul. 17, 2018

(54) CLAMPING AND POSITIONING DEVICE AND OPERATION METHOD THEREOF

(71) Applicant: INDUSTRIAL TECHNOLOGY RESEARCH INSTITUTE, Hsinchu (TW)

(72) Inventors: Po-Hsiu Ko, Taichung (TW); Shou-Xuan Chang, Tainan (TW); Wei-Juh Lin, Taichung (TW); Shao-Ying Hung, New Taipei (TW); Kun-Ying Li, Chiayi (TW); Hsi-Hung Hsiao, Taichung (TW); Yu-Shiang Huang, Taichung (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 306 days.

(21) Appl. No.: 14/583,395

(22) Filed: Dec. 26, 2014

(65) Prior Publication Data

US 2016/0136766 A1    May 19, 2016

(30) Foreign Application Priority Data

Nov. 19, 2014   (TW) .............................. 103140056 A

(51) Int. Cl.
*B25B 5/08*    (2006.01)
*B25B 5/06*    (2006.01)
(Continued)

(52) U.S. Cl.
CPC ............ *B23Q 11/0092* (2013.01); *B23Q 1/70* (2013.01); *B25B 5/061* (2013.01); *B25B 5/087* (2013.01); *B25B 5/122* (2013.01)

(58) Field of Classification Search
CPC ......... B25B 5/061; B25B 5/087; B25B 5/122; B25B 11/00; B23Q 11/0092; B23Q 1/70; B23P 19/04; B23P 19/00
(Continued)

(56) References Cited

U.S. PATENT DOCUMENTS 5,735,514 A * 4/1998 Moore ................. B23Q 16/102
                                                                    192/223.1
5,926,950 A * 7/1999 Asai .................... H05K 13/0413
                                                                    29/740
(Continued)

FOREIGN PATENT DOCUMENTS

CN     201115903 Y     9/2008
CN     201143924 Y     11/2008
(Continued)

OTHER PUBLICATIONS

Intellectual Property Office, Ministry of Economic Affairs, R. O. C, "Office Action", dated May 9, 2016, Taiwan.
(Continued)

*Primary Examiner* — Sarang Afzali
*Assistant Examiner* — Darrell C Ford
(74) *Attorney, Agent, or Firm* — Locke Lord LLP; Tim Tingkang Xia, Esq.

(57) ABSTRACT

A clamping and positioning device includes a base, a rotary member, a moving assembly and an elastic member. The rotary member is rotatably disposed on the base and includes a stopping surface facing the base. The moving assembly includes a moving member movably disposed on the base to have a first and a second position. When being at the first position, the moving member is pressed against the rotary member to allow the stopping surface to apply a normal force to the base; when being at the second position, a gap is formed between the moving member and the rotary
(Continued)

member so the normal force applied by the stopping surface of the rotary member is released from the base. The elastic member has two ends connected to the base and the moving member, respectively. The elastic member normally causes the moving member to be at the first position.

10 Claims, 4 Drawing Sheets

(51) Int. Cl.
 B25B 5/12 (2006.01)
 B23Q 11/00 (2006.01)
 B23Q 1/70 (2006.01)
(58) Field of Classification Search
 USPC ......... 29/428, 559; 269/24, 27, 32, 309–310
 See application file for complete search history.

(56) References Cited

U.S. PATENT DOCUMENTS

| | | | | |
|---|---|---|---|---|
| 6,240,807 | B1* | 6/2001 | Hebener | B23Q 16/10 269/43 |
| 6,457,383 | B1* | 10/2002 | Kschier | B23Q 1/28 409/220 |
| 7,124,861 | B2* | 10/2006 | Maher | F16D 63/008 188/107 |
| 7,931,131 | B2* | 4/2011 | Tatsuda | B23Q 5/56 188/170 |
| 7,971,613 | B2 | 7/2011 | Gass et al. | |
| 8,449,232 | B2 | 5/2013 | Tatsuda et al. | |
| 8,672,103 | B2* | 3/2014 | Tatsuda | B23Q 16/105 184/48.2 |
| 2004/0040424 | A1* | 3/2004 | Smith | B23B 31/4033 82/124 |
| 2008/0125904 | A1* | 5/2008 | Osaki | G05B 19/402 700/170 |
| 2009/0235783 | A1 | 9/2009 | Duane et al. | |
| 2010/0019427 | A1* | 1/2010 | Nishida | B23Q 16/06 269/74 |
| 2010/0123278 | A1* | 5/2010 | Tatsuda | B23Q 16/102 269/57 |
| 2010/0175505 | A1* | 7/2010 | Tatsuda | B23Q 16/102 74/813 L |
| 2013/0105255 | A1 | 5/2013 | Yoshimoto et al. | |
| 2015/0139759 | A1* | 5/2015 | Lin | B23Q 7/1431 414/222.07 |
| 2016/0288297 | A1* | 10/2016 | Yoshimura | B23B 31/4053 |
| 2017/0248190 | A1* | 8/2017 | Ganssle-Klenk | B23Q 11/14 |

FOREIGN PATENT DOCUMENTS

| | | |
|---|---|---|
| CN | 201669562 U | 12/2010 |
| CN | 201792207 U | 4/2011 |
| EP | 0645551 A1 | 3/1995 |
| JP | 2001121369 A | 5/2001 |
| TW | 318416 | 10/1997 |
| TW | 200906536 A | 2/2009 |
| TW | M368508 U | 11/2009 |
| TW | M378807 | 4/2010 |
| TW | M452820 U | 5/2013 |
| TW | I403385 | 8/2013 |
| TW | M462162 U | 9/2013 |
| TW | I439347 B | 6/2014 |

OTHER PUBLICATIONS

Optical rotary table, Precis, Jan. 1982, vol. 4, No. 1.
N. R. Kane et al., A hydrostatic rotary bearing with angled surface self-compensation, Precision Engineering, 2003, 5321, 1-15.
Robert D. Ray et al., Rotation of the Forearm, An Experimental Study of Pronation and Supination, J Bone Joint Surg Am, 1951, Abstract only.
M. Bayat et al., Bending analysis of a functionally graded rotating disk based on the first order shear deformation theory, Applied Mathematical Modelling, 2009, 33, 4215-4230.
T. Yandayan et al., A novel technique for calibration of polygon angles with non-integer subdivision of indexing table, Precision Engineering, Journal of the International Societies for Precision Engineering and Nanotechnology, 2002, 26, 412-424.

* cited by examiner

_US 10,022,830 B2_

CLAMPING AND POSITIONING DEVICE AND OPERATION METHOD THEREOF

CROSS-REFERENCE TO RELATED APPLICATIONS

This non-provisional application claims priority under 35 U.S.C. § 119(a) on Patent Application No(s). 103140056 filed in Taiwan, R.O.C. on Nov. 19, 2014, the entire contents of which are hereby incorporated by reference.

TECHNICAL FIELD

The disclosure relates to a clamping and positioning device and an operation method thereof.

BACKGROUND

During fabrication, a workpiece usually is to be spun to be machined. Thus, manufacturers have developed a positioning device with a loading carrier where the workpiece is disposed. The positioning device can either rotate the loading carrier to rotate the workpiece or stop the rotation of the loading carrier to stop the rotation of the workpiece.

In terms of the positioning device, when the workpiece is rotated, for example, a hydraulic power source is input to rotate the loading carrier; when the workpiece is to be stopped, the power source is also input to drive a braking component to stop the loading carrier. However, when the loading carrier keeps in rotation and a power failure (i.e., power outage) happens accidently and immediately, the loading carrier may not stop such that the workpiece may lose control with the rotation of the lading carrier.

SUMMARY

An embodiment of the disclosure provides a clamping and positioning device, comprising: a base, a rotary member, a moving assembly and an elastic member. The rotary member is rotatably disposed on the base and comprises a stopping surface facing towards the base. The moving assembly comprises a moving member movably disposed on the base to have a first position and a second position. When the moving member is at the first position, the moving member is pressed against the rotary member to allow the stopping surface to apply a normal force to the base; when the moving member is at the second position, a gap is formed between the moving member and the rotary member such that the normal force applied by the stopping surface of the rotary member is released from the base. The elastic member has two ends that are opposite to each other, and the two ends are connected to the base and the moving member, respectively. The elastic member is for normally causing the moving member to be at the first position.

Another embodiment of the disclosure provides a method for operating a clamping and positioning device comprising the following steps. A clamping and positioning device as above mentioned is provided. When the rotary member is to be rotated, the moving member is moved from the first position to the second position and the rotary member is rotated. When the rotary member is to be stopped, the moving member is released such that the elastic member is for normally causing the moving member to move to the first position.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
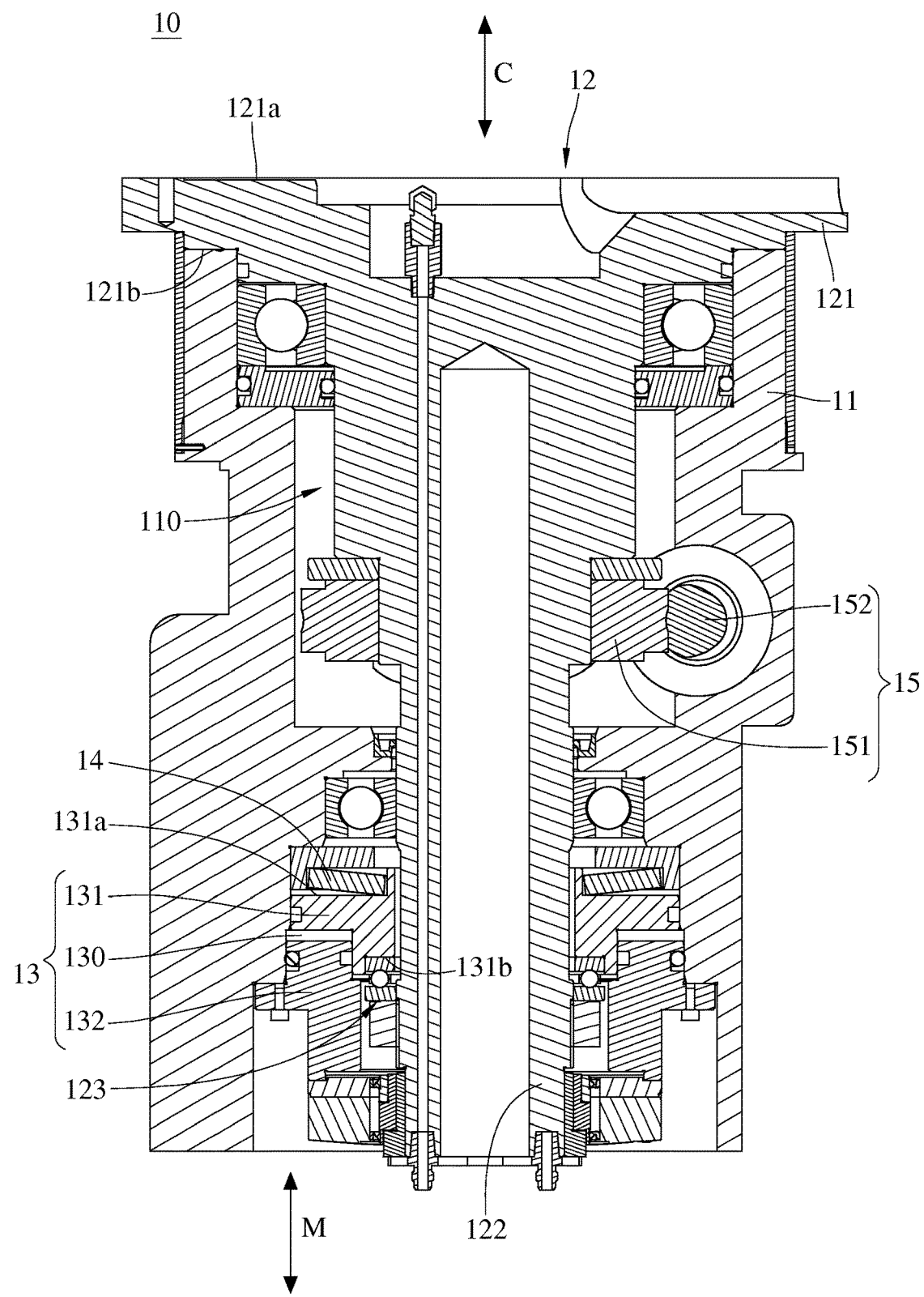
FIG. 1 is a side cross-sectional view of a clamping and positioning device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
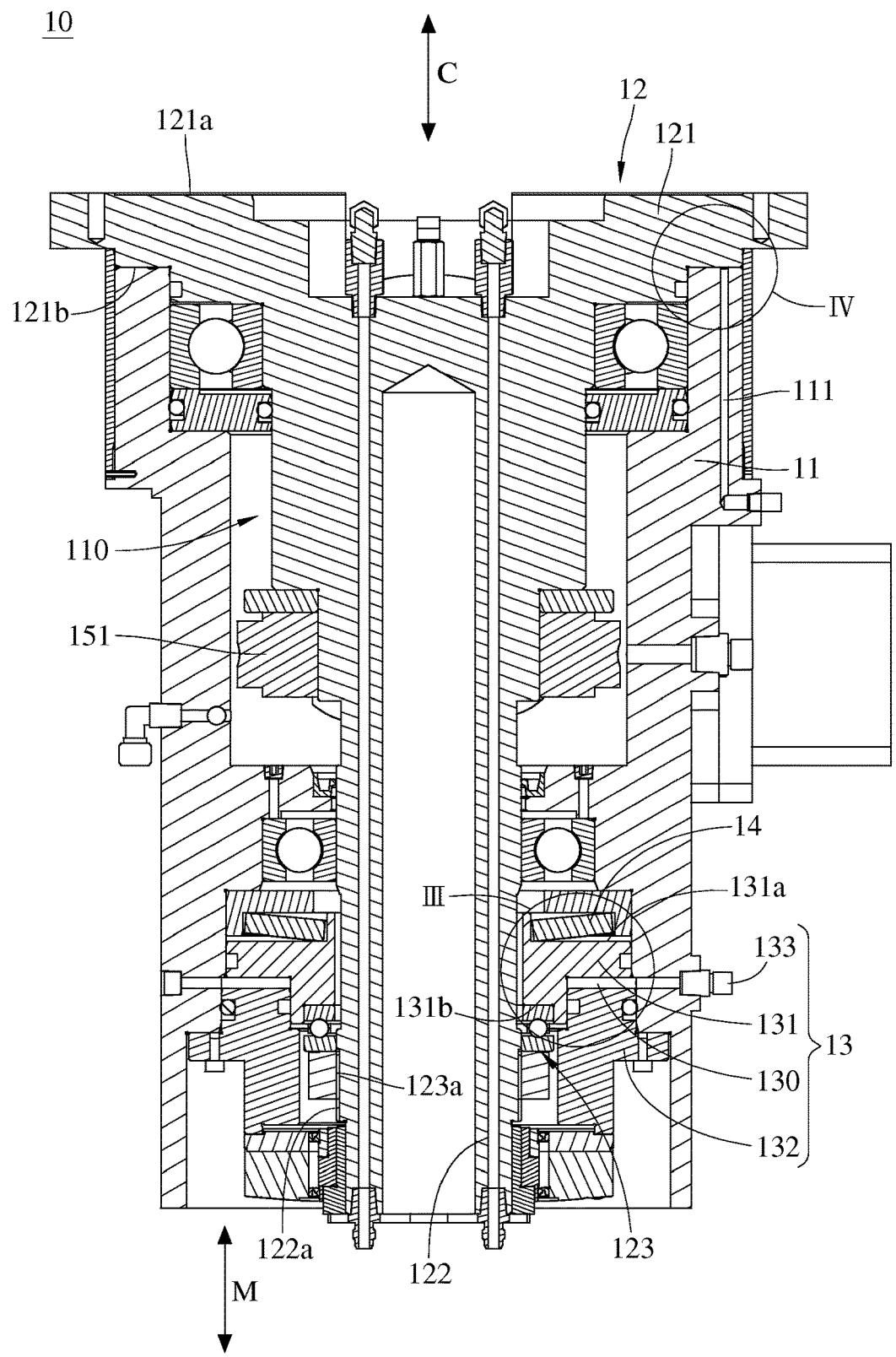
FIG. 2 is a front cross-sectional view of the clamping and positioning device in FIG. 1 according to the embodiment of the disclosure.

Please refer to FIG. 1 and FIG. 2, FIG. 1 is a side cross-sectional view of a clamping and positioning device according to an embodiment of the disclosure, and FIG. 2 is a front cross-sectional view of the clamping and positioning device in FIG. 1 according to the embodiment of the disclosure. In this embodiment of the disclosure, a clamping and positioning device 10 comprises a base 11, a rotary member 12, a moving assembly 13, an elastic member 14 and a rotation driving assembly 15.

The base 11 has an accommodation space 110. The rotary member 12 comprises a loading portion 121, a shaft portion 122 and a pressing portion 123. The loading portion 121, the shaft portion 122 and the pressing portion 123 are all connected to each other. A diameter of the loading portion 121 is greater than a diameter of the shaft portion 122. In this embodiment, the loading portion 121 and the shaft portion 122 are integrated into a single unit, which means the loading portion 121 and the shaft portion 122 cannot be separated from each other. The shaft portion 122 comprises an exterior thread 122_a_, and the pressing portion 123 comprises an inner thread 123_a_ such that the pressing portion 123 can be screwed to the shaft portion 122 by a combination of the exterior thread 122_a_ and the inner thread 123_a_. Hence, a position of the pressing portion 123 can be adjusted with respect to the shaft portion 122. However, the disclosure is not limited to the combination manner of the pressing portion 123 and the shaft portion 122. In other embodiments, the loading portion 121, the shaft portion 122 and the pressing portion 123 are integrated into a single unit.

The rotary member 12 is rotatably disposed on the base 11 about a rotary axis C with respect to the base 11. In this embodiment, the loading portion 121 is located outside the accommodation space 110; the shaft portion 122 and the pressing portion 123 are located inside the accommodation space 110. The loading portion 121 comprises a loading surface 121_a_ and a stopping surface 121_b_. A workpiece can be loaded, disposed or clamped on the loading surface 121a. In addition, the stopping surface 121b faces towards the base 11.

The moving assembly 13 comprises a moving member 131, a hydraulic lid 132 and a hydraulic source 133 and has a hydraulic chamber 130. The moving member 131 is movably disposed inside the accommodation space 110 of the base 11 with respect to the base 11. Moreover, the moving member 131 is located between the loading portion 121 and the pressing portion 123, and the moving member 131 has a first position and a second position with respect to the base 11. The shaft portion 122 penetrates through the moving member 131. The moving member 131 is movable between the first position and the second position along a moving direction M. The moving direction M is substantially parallel to the rotary axis C of the rotary member 12, but the parallel relationship between the moving direction M and the rotary axis C allows a margin of error due to the deviation of fabrication.

The hydraulic lid 132 is disposed inside the accommodation space 110 of the base 11, and the hydraulic lid 132 forms a hydraulic chamber 130 together with the moving member 131. The shaft portion 122 can penetrate through the hydraulic lid 132. The hydraulic chamber 130 communicates (i.e., being interconnected) with the hydraulic source 133. The moving member 131 comprises a connecting surface 131a and a pressing surface 131b. The pressing surface 131b of the moving member 131 can be pressed against the pressing portion 123 of the rotary member 12. The elastic member 14 is disposed inside the accommodation space 110 of the base 11, and the shaft portion 122 can penetrate through the elastic member 14. Two ends of the elastic member 14 that are opposite to each other are connected to the base 11 and the connecting surface 131a of the moving member 131, respectively. The elastic member 14 is normally causing the moving member 131 to be at the first position.

In this embodiment, the connecting surface 131a and the pressing surface 131b are located on two sides of the moving member 131 that are opposite to each other. The hydraulic lid 132 is disposed closer to the pressing surface 131b than the connecting surface 131a. The elastic member 14 is connected with the connecting surface 131a when the elastic member 14 is being compressed. For example, the elastic member 14 is a disk-shaped spring, but the disclosure is not limited thereto. In other embodiments, the connecting surface 131a and the pressing surface 131b are located at the same side of the moving member 131. The hydraulic lid 132 is located closer to the pressing surface 131b than the connecting surface 131a. The elastic member 14 can be connected with the connecting surface 131a when the elastic member 14 is being extended.

The rotation driving assembly 15 comprises a wheel 151 and a worm 152. The wheel 151 is fixed to the shaft portion 122 of the rotary member 12. The worm 152 is engaged with the wheel 151 so as to drive the wheel 151 to rotate, thereby driving the rotary member 12 to rotate.

Following upward and downward directions are described based on the directions in the figures and is for references only, but the disclosure is not limited to the following directions.

Figure 3:
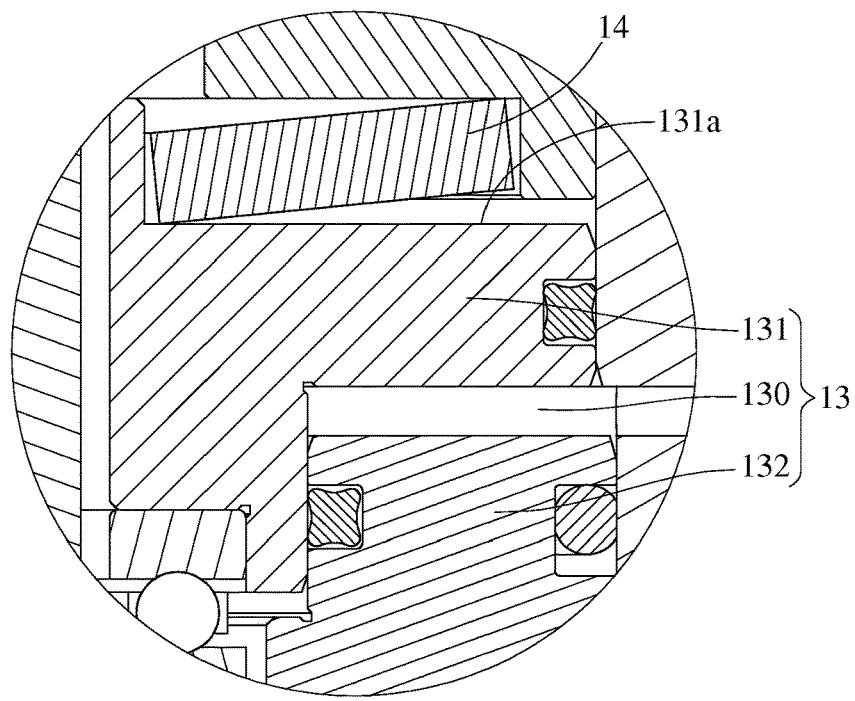
FIG. 3 is a partially enlarged view of a moving member of the clamping and positioning device at a first position in a circle III in FIG. 2.
Figure 4:
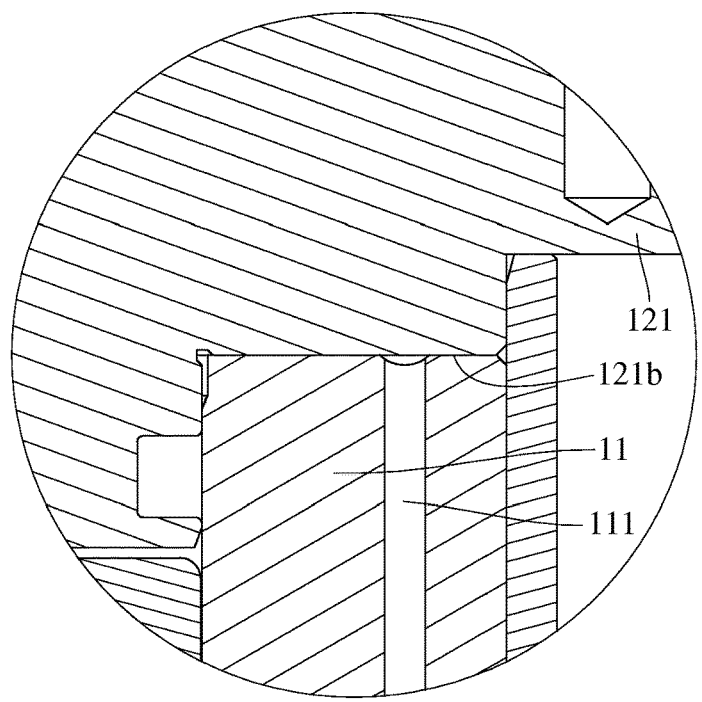
FIG. 4 is a partially enlarged view of the moving member of the clamping and positioning device at the first position in a circle IV in FIG. 2.

Please refer to FIGS. 2 through 4, FIG. 3 is a partially enlarged view of a moving member of the clamping and positioning device at a first position in a circle III in FIG. 2; FIG. 4 is a partially enlarged view of the moving member of the clamping and positioning device at the first position in a circle IV in FIG. 2. When the moving member 131 is at the first position, the elastic member 14 is being compressed to press the moving member 131. Thus, the moving member 131 is pressed downward towards the pressing portion 123 of the rotary member 12. The pressing portion 123 drives the shaft portion 122 downward to cause the loading portion 121 to move, thereby causing the stopping surface 121b to press against the base 11. Thus, the stopping surface 121b of the loading portion 121 of the rotary member 12 applies a normal force to the base 11. The greater the normal force applied to the base 11 is, the greater the friction between the base 11 and the rotary member 12 is. Hence, when the moving member 131 is at the first position, the loading portion 121 and the base 11 do not rotate with each other so they are stopped, and therefore the moving assembly 13 and the rotation driving assembly 15 are not in operation. Furthermore, the normal force which applies to the base 11 is provided by the stopping surface 121b. Based on such a manner, the area which the rotary member 12 contacts the base 11 is greater than the area that the rotary member 12 contacts the base 11 by point-by-point. Furthermore, the stability of the braking is enhanced, and the wear is more balanced and slower than the manner that the contact is point-by-point.

The following describes the operation method of the clamping and positioning device 10.

Figure 5:
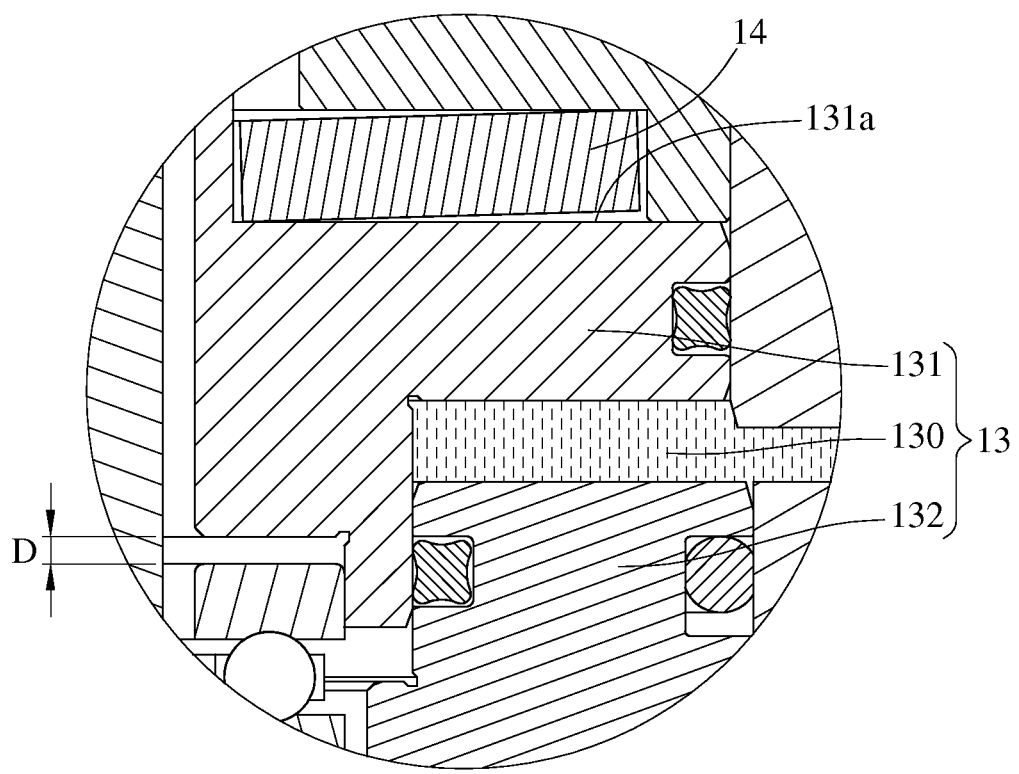
FIG. 5 is a partially enlarged view of the moving member of the clamping and positioning device at a second position in the circle III in FIG. 2.

Please refer to FIGS. 2 and 5, FIG. 5 is a partially enlarged view of the moving member of the clamping and positioning device at a second position in a circle III in FIG. 2. In this embodiment, since movements of the moving member 131 between the first position and the second position is much smaller than the dimension of the clamping and positioning device 10, the difference of positions of the moving member 131 cannot be easily shown in FIG. 2. Thus, FIG. 3 is compared with the FIG. 5, it is easier to observe the different positions of the moving member 131 when the moving member 131 is either at the first position or the second position.

When the rotary member 12 is to be rotated, the hydraulic source 133 of the moving assembly 13 is set in motion to supply a hydraulic fluid for the hydraulic chamber 130. As shown in FIG. 5, the moving member 131 is pressed by a hydraulic pressure of the hydraulic fluid to move upward to the second position. At this time, the moving member 131 causes the elastic member 14 to be more compressed, and a gap D is formed between the moving member 131 and the pressing portion 123 of the rotary member 12 (as shown in FIG. 5), which means the moving member 131 and the pressing portion 123 are separated from each other. Since the moving member 131 is separated from the pressing portion 123, the rotary member 12 has a residual space between the base 11 and itself, and even the rotary member 12 can be slightly moved toward the base 11. Thus, the normal force which applies to the base 11 and produced from the stopping surface 121b can be released, which reduces the friction between the loading portion 121 and the base 11. Afterwards, the worm 152 and the wheel 151 of the rotation driving assembly 15 are operated to rotate rotary member 12. Moreover, the base 11 further comprises a lubrication channel 111 for supplying a lubricant between the stopping surface 121b the base 11.

When the rotary member 12 is to be stopped, the rotation driving assembly 15 and the hydraulic source 133 of the moving assembly 13 can be stopped to be not in operation. At this time, the moving member 131 is not being pressed upward by the hydraulic fluid but being pressed downward by the elastic member 14 so as to release the moving member 131. Thus, the elastic member 14 causes the moving member 131 to move back to the first position, the loading portion 121 and the base 11 stop moving (namely, brake) again. That is to say, both the rotation driving assembly 15 and the moving assembly 13 stop their operations. Accordingly, when there is a power failure or some circumstances that the power source is interrupted happens, the rotary member 12 can stop rotating in order to prevent the loading portion 121 with the workpiece from uncontrollably rotating.

In this embodiment, under the circumstances that the position of the pressing portion 123 can be adjusted with respect to the shaft portion 122, when the normal force applied to the base 11 by the stopping surface 121b of the loading portion 121 is too small or the material of the base 11 and that of the loading portion 121 are worn down, the position of the pressing portion 123 can be adjusted closer to the loading portion 121 than its original position. Thus, the compression of the elastic member 14 is increased so as to enhance the friction between the stopping surface 121b of the loading portion 121 and the base 11. Consequently when the materials of the stopping surface 121b of the loading portion 121 and the base 11 are worn down, the clamping and positioning device 10 does not need to be replaced immediately. Furthermore, the clamping and positioning device 10 is easy to maintain and the lifespan can be longer.

To sum up, the clamping and positioning device and the operation method thereof according to the embodiment of the disclosure, the elastic member normally causes the moving member to press against the rotary member. When the clamping and positioning device has a power failure, the stopping surface of the rotary member applies the normal force to the base. Thus, the friction between the stopping surface and the base is augmented, which makes the clamping and positioning device stop. Thus, the brake of the clamping and positioning device prevents the workpiece disposed on the loading portion of the rotary member from uncontrollably rotating. Moreover, additional power source does not need to input to the clamping and positioning device when the clamping and positioning device is in the brake condition, which saves the use of energy. In addition, when the normal force applied to the base by the stopping surface of the loading portion is too small or the materials of the loading portion and the base are worn down, the position of the pressing portion can be adjusted with respect to the shaft portion in order to adjust the compression of the elastic member. Thus, the friction between the stopping surface of the loading portion and the base are adjusted accordingly. Consequently, the clamping and positioning device does not need to be replaced immediately such that the clamping and positioning device is easy to maintain and has longer lifespan.

What is claimed is:

1. A clamping and positioning device, comprising:
   a base;
   a rotary member rotatably disposed on the base and comprising a stopping surface facing towards the base, and the rotary member is movable toward and away from the base;
   a moving assembly comprising a moving member movably disposed on the base and movable between a first position and a second position with respect to the rotary member; when the moving member is moved toward the first position, the moving member is pressed against the rotary member to drive the rotary member to move toward the base so as to allow the stopping surface to apply a normal force to the base; when the moving member is at the second position, the moving member is separated from the rotary member to form a gap with respect to the rotary member such that the normal force applied by the stopping surface of the rotary member is released from the base; and
   an elastic member with two ends that are opposite to each other, the two ends being connected to the base and the moving member, respectively, and the elastic member normally causing the moving member to be at the first position.

2. The clamping and positioning device according claim 1, wherein the base has an accommodation space, the rotary member comprises a loading portion, a shaft portion and a pressing portion that are connected with each other, a diameter of the loading portion is greater than a diameter of the shaft portion, the loading portion is located outside the accommodation space, the shaft portion and the pressing portion are located inside the accommodation space, the stopping surface is located at the loading portion; when the moving member is at the first position, the moving member is pressed against the pressing portion so as to allow the stopping surface of the loading portion to apply the normal force on the base.

3. The clamping and positioning device according claim 2, wherein the loading portion, the shaft portion and the pressing portion are integrated into a single unit.

4. The clamping and positioning device according claim 2, wherein the loading portion and the shaft portion are integrated into a single unit, and the pressing portion is movably disposed on the shaft portion.

5. The clamping and positioning device according claim 4, wherein the pressing portion comprises an inner thread, the shaft portion comprises an exterior thread, and the pressing portion is screwed to the shaft portion.

6. The clamping and positioning device according claim 1, wherein the moving member is for moving between the first position and the second position along a moving direction, the rotary member has a rotary axis, and the moving direction is substantially parallel to the rotary axis.

7. The clamping and positioning device according claim 1, wherein the moving member comprises a connecting surface and a pressing surface that are opposite to each other, the connecting surface of the moving member is connected with the elastic member, the pressing surface of the moving member is pressed against the rotary member when the elastic member is compressed.

8. The clamping and positioning device according claim 1, wherein the moving assembly further comprises a hydraulic lid and a hydraulic source and has a hydraulic chamber, the hydraulic chamber is formed between the hydraulic lid and the moving member, the hydraulic chamber communicates with the hydraulic source, the hydraulic source is for supplying a hydraulic fluid for the hydraulic chamber so as to move the moving member to the second position.

9. The clamping and positioning device according claim 1, further comprising a rotating assembly disposed on the rotary member for driving the rotary member to rotate.

10. A method for operating a clamping and positioning device, comprising following steps of:
    providing a clamping and positioning device as claimed in claim 1;
    when the rotary member is to be rotated, the moving member is moved from the first position to the second position and the rotary member is rotated; and
    when the rotary member is to be stopped, the moving member is released such that the elastic member is for normally causing the moving member to move to the first position.

* * * * *